United States Patent
Walenty et al.

(10) Patent No.: US 6,212,458 B1
(45) Date of Patent: Apr. 3, 2001

(54) ADAPTIVE BRAKE COMPENSATION FOR GRADE BRAKING

(75) Inventors: Allen John Walenty, Macomb; Kevin Gerard Leppek; Scott R. Kloess, both of Rochester Hills, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/307,854

(22) Filed: May 10, 1999

(51) Int. Cl.[7] ............................. G06F 17/00; G06F 19/00
(52) U.S. Cl. ................... 701/51; 701/64; 477/15; 477/68
(58) Field of Search .................... 701/51, 52, 64, 701/110; 477/14, 15, 64, 68, 79; 180/170

(56) References Cited

U.S. PATENT DOCUMENTS

| | | |
|---|---|---|
| 5,056,637 * | 10/1991 | Miyawaki et al. ................ 477/39 |
| 5,217,086 * | 6/1993 | Morimoto ........................ 180/177 |
| 5,319,998 * | 6/1994 | Iwatsuki et al. ................. 477/149 |
| 5,389,046 * | 2/1995 | Timte et al. ..................... 475/127 |
| 5,707,318 * | 1/1998 | Shimei et al. .................... 477/133 |

* cited by examiner

Primary Examiner—William A. Cuchlinski, Jr.
Assistant Examiner—Gertrude Arthur
(74) Attorney, Agent, or Firm—Jeffrey A. Sedlar

(57) ABSTRACT

A control for an automatic shifting power transmission employs an algorithm to determine the proper gear ratio during vehicle deceleration. The algorithm establishes downshift grade requirements based on the brake pressure and speed threshold targets based on brake pressure. A grade average is calculated from the operating parameters of acceleration, engine braking, aerodynamic drag, rolling resistance and brake torque deceleration. If the grade average is within downshifting range and the speed target is met, the control commands a downshift to the next lower gear ratio. The downshift grade requirements decrease as brake pressure increases and speed targets increase as brake pressure increases.

7 Claims, 5 Drawing Sheets

ADAPTIVE BRAKE COMPENSATION FOR GRADE BRAKING

TECHNICAL FIELD

This invention relates to vehicle braking and more particularly to powertrain ratio interchanges during vehicle braking.

BACKGROUND OF THE INVENTION

Grade braking in passenger vehicles has been left to the purview of the operator of the vehicle. If the operator wishes the vehicle to decelerate or have a constant speed on a down grade, the brake pedal is depressed in an effort to slow the vehicle. Many drivers recognize that, with automatic transmissions, it is possible to control the down grade speed somewhat by shifting the transmission to a lower drive ratio (fourth to third, or fourth to third to second) and employing the brakes simultaneously. As with manual or countershaft type transmissions, this requires a manual input or shift effort from the operator.

In some instances, the operator may be slow to recognize the increasing speed rate of the vehicle. Under these conditions, the brake application pressure must be increased. While this maintains the vehicle speed in a range that the operator finds comfortable, the brake wear, lining and rotor temperature and the amount of brake fade increase. This can have a shortening effect on the life of the brakes which will require the vehicle owner to replace or service the brakes more often.

With the advent of electro-hydraulic controls, many additional automatic functions can be made available to the operator and transmission control becomes more precise. Ratio interchanges are considerably improve with the use of lookup tables to determine the shift sequence and timing. The widespread introduction of anti-lock braking systems has also improved the vehicle braking function.

SUMMARY OF THE INVENTION

It is an object of the present invention to provide and improved relationship between the ratio interchange function of the transmission and the vehicle braking operation.

In one aspect of the present invention, brake actuation is a measure of the deceleration rate desired by the operator. In another aspect of the present invention, compensation for brake fade conditions are provided.

In yet another aspect of the present invention, the transmission gear ratio is considered during braking maneuvers. In still another aspect to the present invention, a ratio interchange is commanded during vehicle braking depending on the brake pressure and sensed grade condition.

In a further aspect of the present invention, the downshift range is a function of the current transmission ratio, the speed of the vehicle and the brake pressure. In a yet further aspect of the present invention when a downshifting range is perceived, the speed threshold for a shift decision is determined by brake pressure. In a still further aspect of the present invention, brake pad temperature is maintained below a predetermined level by issuing a transmission downshift command if necessary to assist the braking function even if the vehicle is not on a grade.

The present invention is particularly useful with electronically controlled multi-speed power transmissions, but can be easily adapted to other types of power transmissions such as continuously variable type systems. The electronic control incorporates a central processing unit which includes a preprogrammed digital computer. During control of the transmission a grade braking algorithm is processed to determine if the vehicle speed is compatible with the perceived desired deceleration of the driver.

To maintain the desired deceleration, the transmission control is instructed to downshift the transmission to a lower gear ratio if the vehicle braking is not sufficient to attain the desired result. To accomplish this the algorithm responds to driver input signals from the throttle and the vehicle brake control. The control has grade downshift requirements or grade percentage thresholds and vehicle speed targets for each of the gear ratios below the top ratio which, in most current passenger vehicles, is fourth gear. If the driver is perceived as wishing to slow the vehicle, brake applied and or throttle released, the algorithm will command a downshift when the grade downshift requirements and the speed targets are met for the next lower gear available. The downshift requirement and the speed threshold vary with the brake input which is usually determined by brake pressure.

DESCRIPTION OF AN EXEMPLARY EMBODIMENT

Figure 1:
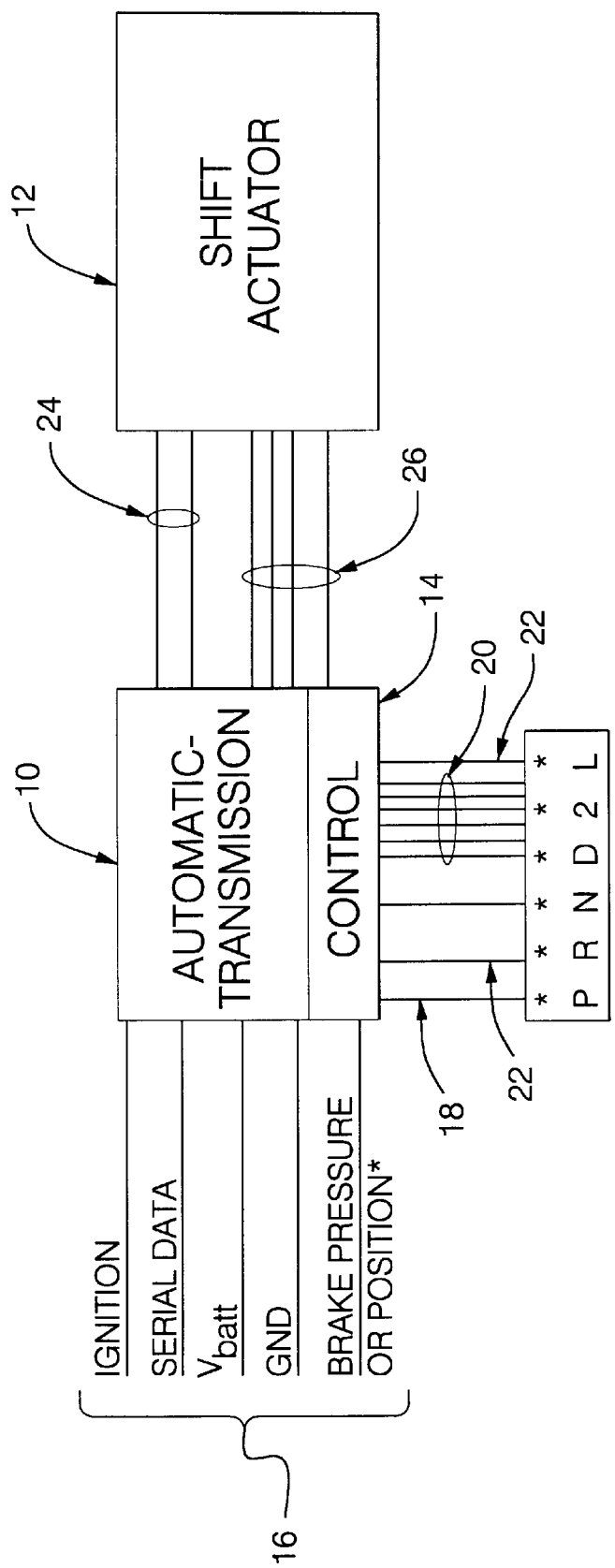
FIG. 1 is a diagrammatic representation of a transmission incorporating the present invention.

A conventional automatic transmission 10 is depicted diagrammatically in FIG. 1. The transmission 10 preferably has four or more speeds from a plurality of planetary gear sets which are controlled through the selective engagement or actuation of hydraulically operated friction clutches and brakes. These transmissions are well-known in the art of power transmission such that a core detailed description of their structure and operation is not considered necessary at this point. The transmission 10 has a shift actuator 12 which may include electronic actuated mechanism or electromechanical mechanisms. The actuator 12 will operate or position control valves, not shown, to the appropriate operating condition to control the engagement and disengagement of the clutches and brakes whether an electronic system or an electromechanical system or an electro-hydraulic system is employed.

The transmission 10 has a control mechanism 14 which includes the control valves and electrical devices such as solenoids and pressure transducers as well as a central processing unit (CPU). The CPU is a conventional electronic mechanism having a preprogrammed digital computer, memory and at least one I/O section. The memory stores various data used by the CPU and includes look-up tables or array that are usable with the present invention. The I/O section receives input signals 16 from various vehicle systems. The input signals 16 can include engine ignition and throttle condition, brake pressure or position, and voltage from the vehicle electrical system to name a few.

The transmission 10 also has a position selector and indicator (PRNDL) 16 that permits the operator to select a drive condition and to provide an indication of the position currently selected. The PRNDL has a gear select wire 18 and six indicator wires 20 communicating with the control 14. The PRNDL 16 also has two ground wires 22. The wire 18 sends a signal to the control 14 which will inform the actuator 12 of the operator's request. The indicator wires 20 provide signals to the PRNDL 16 that the request has been achieved. The control 14 issues signals, through a pair of power wires 24, to the actuator 12. In response to the signals in wires 24, the actuator 12 operates one or more valves in the control to the proper position to complete the operator request. Four feedback wires 26 inform the control 14 of the position that the indicator has achieved. These systems are well-known in the art of power transmission. These systems have been denoted as "shift by wire" controls.

The present invention seeks to utilize this basic system to assist the operator in selecting the most efficient transmission ratio to employ during vehicle deceleration, particularly when the vehicle is negotiating a down grade. This is accomplished with the present invention by a sub-routine algorithm which is executed in the CPU during the normal course of vehicle operation. The sub-routine algorithm is set forth in FIGS. 2A, 2B, 2C, 2E and 2F. In this sub-routine, brake pressure or brake pedal position directly reflects the deceleration rate requested by the operator. When the actual deceleration rate of the vehicle is lower than the requested deceleration rate, the vehicle is presumed to be either on a downgrade or in a brake fade condition. The brake fade condition can arise when the metal brake pads are cold, hot or wet. The algorithm of this invention will not only assist in decelerating the vehicle on a downgrade but will also be invoked during a brake fade condition if necessary.

The algorithm continually calculates and stores a perceived grade condition based on the following equation:

Perceived Grade=Vehicle Acceleration+Engine Braking+Aerodynamic Drag+Rolling Resistance+Brake Torque Deceleration.

The vehicle acceleration is known from accelerometers on various components of the vehicle. The engine braking can be determined from torque transducers. The aerodynamic drag and rolling resistance are known design factors which can be contained in look-up tables in the CPU. Brake torque deceleration can be determined from the brake pressure or torque transducers at the wheels.

If a significant brake fade should occur, the Grade calculation will yield a higher perceived value in a linear relationship to the current brake efficiency even when the vehicle is on a level surface. The control 14 will issue a downshift command to the transmission 10 which will assist in decelerating the vehicle in accordance with the operator brake request. This will prevent the brake pads from reaching a temperature range in which brake wear can be accelerated. Thus the present invention will improve the life span of the brake pads.

The thresholds for downshift speeds and grade percentages are proportional to brake pressure which is seen as an operator request for vehicle deceleration. Thus the thresholds will vary with brake pressure. These thresholds will, as noted above, also assist during normal braking. The algorithm is design to provide a more aggressive downshift schedule during braking. The more aggressive schedule assumes that a brake input signals a desire to decelerate more rapidly and accordingly commands a downshift to assist in braking the vehicle. This will result in more frequent downshifts on smaller grades and perhaps on level surfaces.

A perceived grade average is determined from successive grade calculations taken over a predetermined distance or time. The grade average, vehicle speed and brake input have individual calculations that determine the downshift points to the third gear ratio, the second gear ratio and the first gear ratio. The downshift points to second ratio and first ratio have maximum threshold values to maintain the engine below a predetermined speed.

If the throttle is released and the brakes are not applied, the operator's intention is indeterminate. Under this condition the operator may wish to accelerate (coasting downhill), decelerate (coasting uphill or downhill or to a stop on level ground) or maintain the current vehicle speed. The algorithm adopts a less aggressive shift schedule under these conditions. The algorithm relies on an operator input by way of brake or throttle manipulation to indicate the desire for acceleration or deceleration. The downshift range is a function of current gear ratio, vehicle speed and brake pressure. The downshift grade requirements decrease as brake pressure increases in accordance with the following equations:

$1^{st}$ Gear Downshift Grade=K1stGrd−(K1stBP*Brake Pressure)

$2^{nd}$ Gear Downshift Grade=K2ndGrd−(K2ndBP*Brake Pressure)

$3^{rd}$ Gear Downshift Grade=K3rdGrd−(K3rdBP*Brake Pressure).

The terms beginning with K are constants in the equations. If the grade average is within the downshifting range for the current ratio, a speed threshold is determined based on brake pressure in accordance with the following equations:

$1^{st}$ Gear Speed Target=K1stSpd*Brake Pressure $2^{nd}$ Gear Speed Target=K2ndSpd*Brake Pressure $3^{rd}$ Gear Speed Target=K3rdSpd*Brake Pressure The terms beginning with K are constants in the equations. For example, K1stBP is a brake point estimate for brake torque in first range.

The algorithm for performing the adaptive brake compensation is described in FIGS. 2A, 2B, 2C, 2E and 2F. The algorithm is started at step 30 in FIG. 2A. This algorithm is a sub-routine in a larger program that continually runs whenever the vehicle is in operation. The main program controls events such as shift timing, system pressures, engine operation and anti-lock braking to name a few. At step 32 an number of input data points are read or calculated and stored. At step 34, the vehicle speed is determined and if the speed is equal to zero, a shift delay timer is set in step 36 and the algorithm passes to point A in FIG. 2B. If the vehicle speed is greater than zero, the transmission selector is queried at step 38 for park, reverse or neutral and if the answer is positive the algorithm again proceeds to point A.

If the answer at step 38 is negative, steps 40 42 and 44 are performed in sequence. During these steps calculations are undertaken and the algorithm passes to step 46 where the system determines if the operator has engaged the adaptive grade braking program. If the system is off, the algorithm passes to point B in FIG. 2F. If the system is activated, the vehicle speed is again determined at step 48 and if it is zero the algorithm is again passed to point B. If the vehicle speed is greater than zero, the algorithm continues at point C in FIG. 2b with step 50 where the brake switch position is queried. If the brake signal is activated, the algorithm passes to point F in FIG. 2E. If the signal is not activated, step 52 is performed to determine the condition of the engine throttle.

Figure 2A:
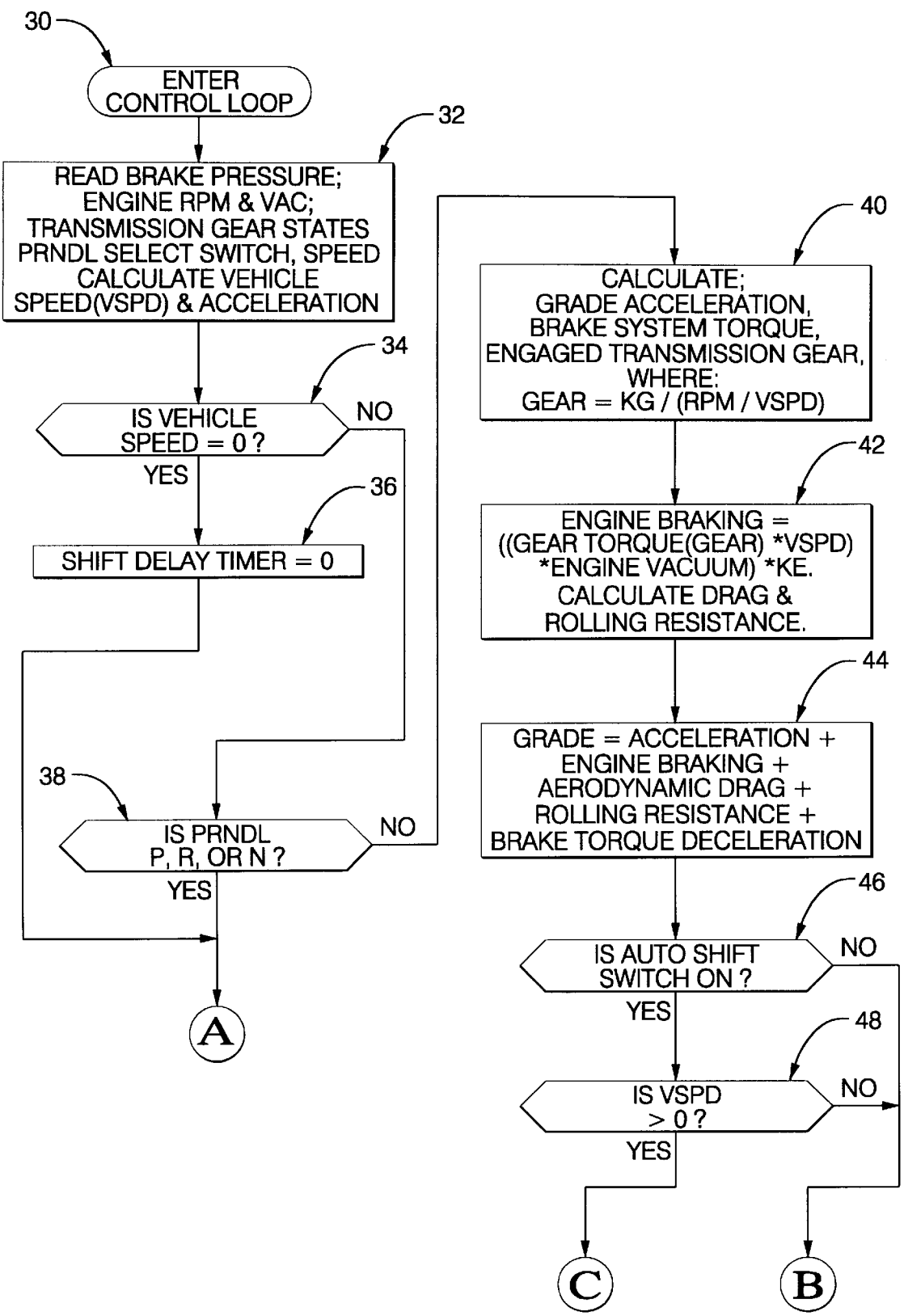
FIGS. 2A, 2B, 2C, 2E and 2F are an algorithm used with the present invention.
Figure 2:
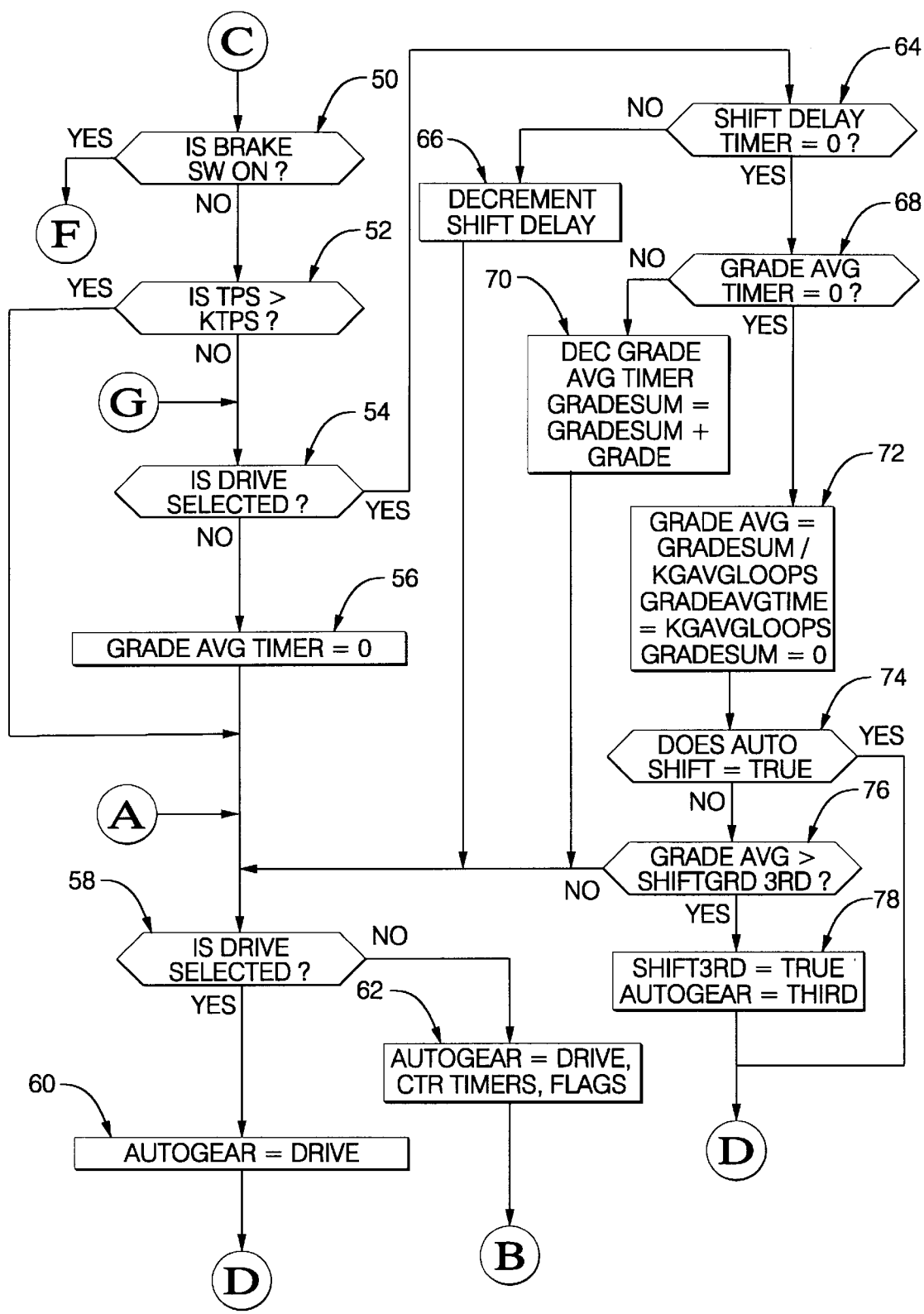
Figure 2C:
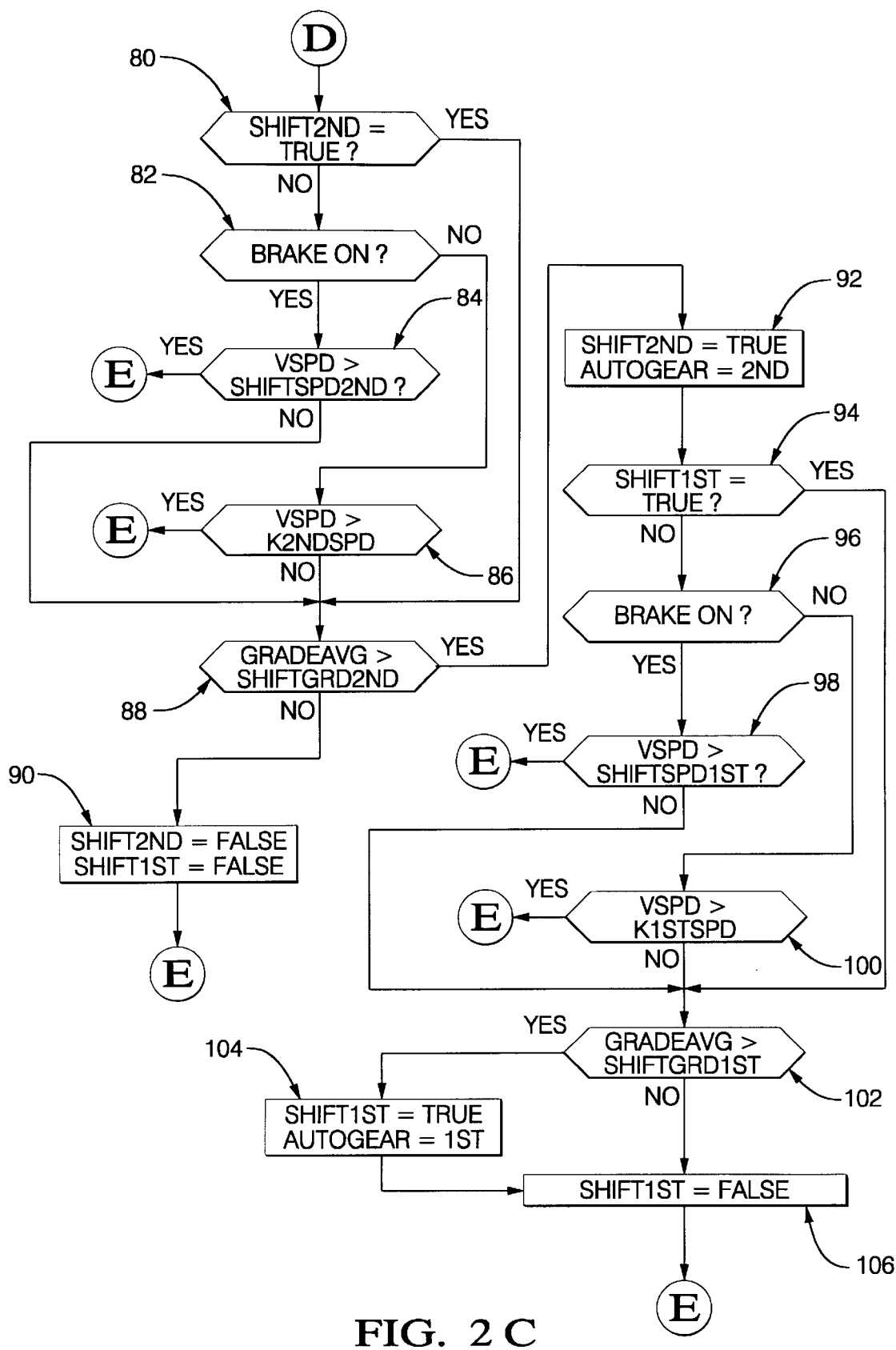
Figure 2:
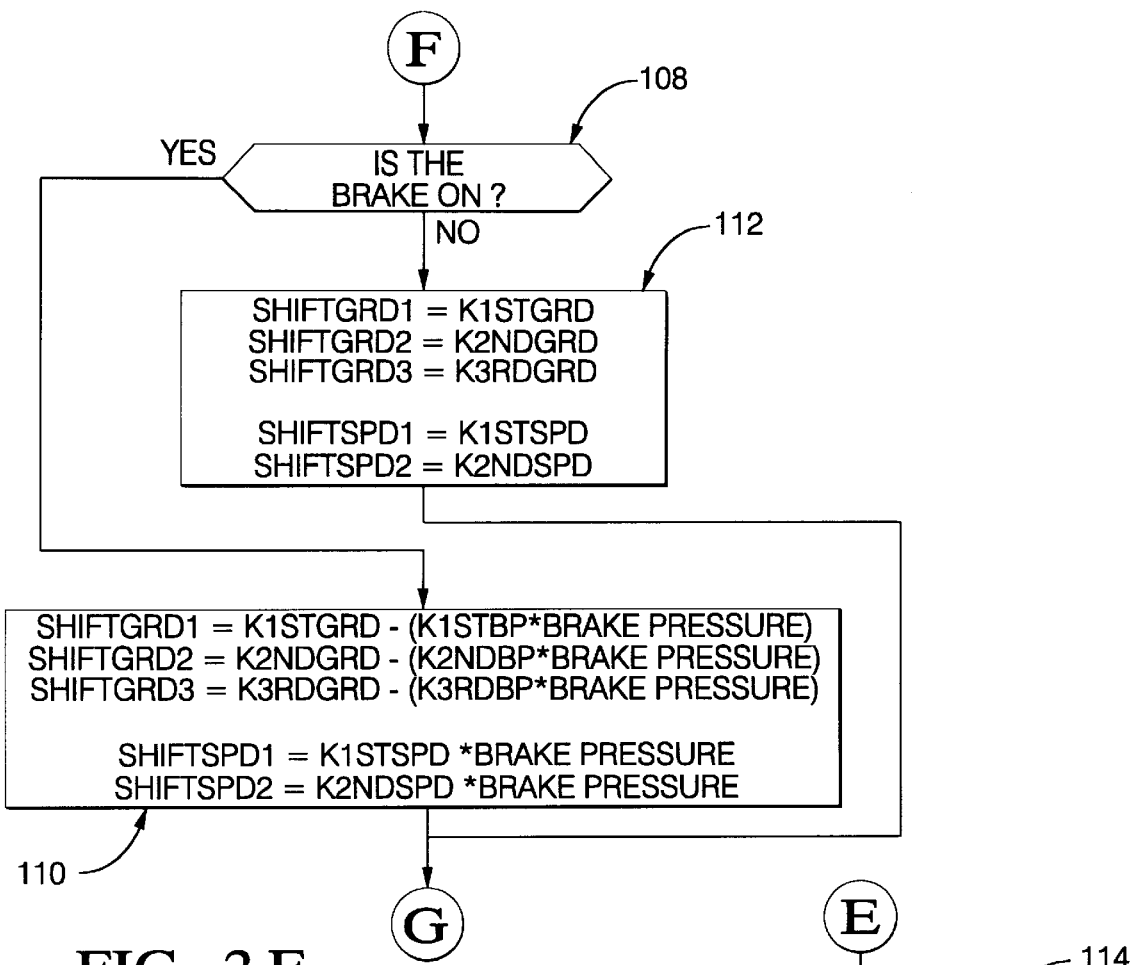
Figure 2:
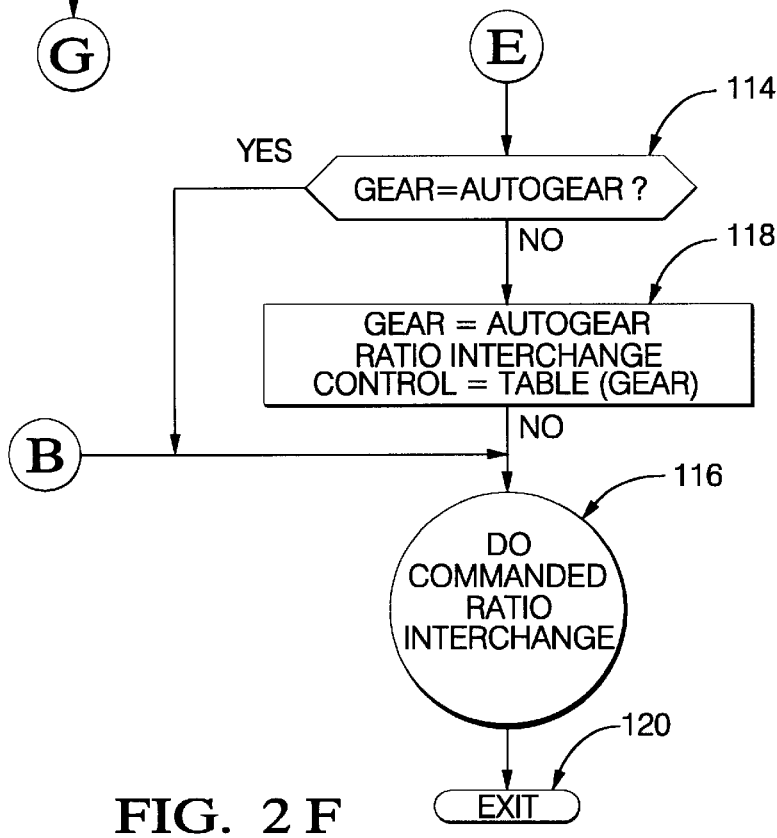

If the engine throttle is greater than a predetermined constant the algorithm passes to point A, otherwise step 54 is undertaken and the PRNDL position is again determined to establish if "Drive" has been selected and if not, a timer is set to zero at step 56 and the PRNDL position is again queried at step 58 and if the answer is positive, step 60 is performed and the algorithm passes to point D in FIG. 2C. If the answer is negative at step 58, step 62 is performed and various switched and flags are set and the algorithm passes to point B.

If "Drive" is selected at step 54, step 64 is performed to determine if the shift delay timer has timed out and, if not, step 66 decrements the timer and the algorithm again proceeds to point A. If the shift delay timer at step 64 has timed out, step 68 determines if the grade average timer has timed out and, if not, the timer is decremented at step 70 and the algorithm is passed to point A.

If the grade average timer has timed out, step 72 calculated the grade average and resets some variables after which the algorithm proceeds to step 74 where the auto shift is queried. If the answer is no, the grade average is determined relative to the third gear threshold at step 76 and is this answer is also negative, the algorithm passe to point A. However, if the answer at step 76 is positive, step 78 is performed to issue a downshift to third ratio command and the algorithm proceeds to point D. If the response at step 74 is positive, the algorithm passes to point D and step 80 where it is determined a shift to second gear has been commanded. If the response at step 80 is negative, the condition of the vehicle brakes is queried at step 82 and if the answer here is positive, the vehicle speed is read and compared with a second gear value at step 84 to determine if second gear should be established. If the answer at step 84 is positive, the algorithm passes to point E in FIG. 2F. If the answer at step 80 is negative, the algorithm passes to step 86.

If the result at step 80 is positive, step 88 is performed where the vehicle speed is compared to the second gear speed target. If the target is exceeded, the algorithm passes to point E and if the target is not exceeded, step 86 is processed. At step 86 the algorithm determines if the grade average exceeds the downshift grade requirement for second gear and if not proceeds to step 90 which sets some flags and passes the algorithm to point E. If the answer at step 86 is positive, step 92 is performed which commands a shift to second gear and passes the algorithm to step 94.

At step 94, it is determined if a shift to first has been requested and, if not, step 94 is performed to determine the condition of the vehicle brakes. If the vehicle brake is applied, step 98 determines if the vehicle speed is greater than the first gear maximum and, if, so passes the algorithm to point E. If the comparison at step 98 results in a negative response, step 100 is performed to determine if the vehicle speed is greater than the first gear speed target and, if it is, the algorithm passes to point E.

If the response at step 100 is negative, the algorithm perform step 102. Also if the response at step 94 was positive, the algorithm is commanded to step 102. At step 102, it is determined if the grade average is greater than the downshift grade requirement for first gear and if it is, the algorithm performs step 102 which commands a shift to first gear at step 104. If the response at step 102 is negative, a shift to first is denied at step 106. Following either step 104 or step 106, the algorithm is passed to point E.

At step 50 the brake switch position is determined and, if the switch is on, the algorithm passes to point F and step 108 is performed which determines the actuation of the vehicle brakes, i.e. brake pressure. If the brakes are engaged, step 110 determines the current thresholds for downshift grade requirements and the gear speed targets for the current brake pressure. If no brake pressure is present at step 108 then step 112 is performed and the thresholds are set at constant values for the respective grade requirements and speed targets. Following step 110 or step 112, the algorithm passes to point G.

Steps 84, 88, 90, 98, 100 and 106 all pass the algorithm to point E in FIG. 2F. At point E, step 114, the algorithm determines if the transmission is in the range required by the algorithm and if so performs step 116 which sets the transmission control to command the proper gear ratio through the shift actuator 12. If the ratio is correct when step 116 is encountered, the sub-routine exits to the main program without commanding a ratio change. If the response at step 114 is negative, step 118 is performed where the commanded gear is set and a look-up table is used to determine the proper operation of the shift actuator 12. The algorithm then performs step 116 using the information given in step 118 to command a shift to the required ratio and then exits the subroutine a step 120. It should be noted that the subroutine arrives at step 116 from either point B or point E. Point F leads to point G. Points A, C or G all lead to either point B or point D. Point D leads to point E such that the algorithm always exits at step 120.

Those skilled in the art of vehicle braking and automatic transmissions will recognize the value to improved braking efficiency in permitting the control to assess and control the downshifting on grades. Also the present invention provides improved vehicle braking during a brake fade condition which the operator may not immediately recognize. It should be noted that increasing the brake pressure reduces the downshift grade braking requirement and increases the speed target. During a brake fade condition, the operator response is to increase the brake actuation which will result, with the present invention, in a ratio downshift at a higher threshold of vehicle speed when compared to normal brake deceleration.

What is claimed is:

1. A control for an automatic transmission having a plurality of forward drive ratios in a vehicle having operator actuated brakes, said control comprising:

means for determining a vehicle speed;

means for determining a brake pressure;

means for determining a grade average;

means for determining a downshift grade requirement for the vehicle based at least partially on said brake pressure;

means for determining a speed threshold based at least partially on said brake pressure; and transmission ratio control means for downshifting the transmission to a lower gear ratio when a predetermined amount of brake pressure is present, said downshifting grade requirement is exceeded and said vehicle speed is below said speed threshold.

2. A control for an automatic transmission having a plurality of forward drive ratios in a vehicle having operator actuated brakes, said control comprising:

means for determining a vehicle speed;

means for determining an amount of brake actuation means for determining a grade average from at least a vehicle engine braking factor, a vehicle aerodynamic factor, a rolling resistance factor, a brake torque deceleration factor and a vehicle acceleration factor;

means for determining a downshift grade requirement for the vehicle based at least partially on said amount of brake actuation;

means for determining a speed threshold based at least partially on said amount of brake actuation; and transmission ratio control means for downshifting the transmission to a lower gear ratio when a predetermined amount of brake actuation is present, said downshifting grade requirement is exceeded and said vehicle speed is below said speed threshold.

3. A control for an automatic transmission having a plurality of forward drive ratios in a vehicle having operator actuated brakes, said control comprising:

means for determining a vehicle speed;

means for establishing an amount of brake actuation;

means for determining a grade average;

means for determining a downshift grade requirement for the vehicle based at least partially on said amount of brake actuation;

means for determining a speed threshold based at least partially on said amount of brake actuation and transmission ratio control means for downshifting the transmission to a lower gear ratio when said down shifting grade requirement is exceeded and said vehicle speed is below said speed threshold.

4. The control defined in claim 3 further comprising:

said down shifting grade requirement also being partially determined by the current drive ratio in the transmission.

5. The control defined in claim 3 further comprising:

said speed threshold being determined at least partially by the current drive ratio in the transmission.

6. The control defined in claim 5 further wherein said down shifting grade requirement also being partially determined by the current drive ratio in the transmission; said down shifting grade requirement decreases as said amount of brake actuation increases.

7. The control defined in claim 6 further wherein said speed threshold increases as said amount of brake actuation increases.

* * * * *